United States Patent [19]

Whelan

[11] 4,246,359
[45] Jan. 20, 1981

[54] FLAME RETARDANT FOR HYDROCARBON DIENE RUBBERS

[75] Inventor: William P. Whelan, Woodbury, Conn.

[73] Assignee: Uniroyal, Inc., New York, N.Y.

[21] Appl. No.: 55,124

[22] Filed: Jul. 5, 1979

[51] Int. Cl.$^3$ ............................................... C08J 9/00
[52] U.S. Cl. ................................ 521/92; 260/45.7 R; 260/45.75 P; 260/5; 521/90; 521/139; 521/140; 521/907; 525/187; 525/192; 525/214; 525/232; 525/235; 525/321
[58] Field of Search .................... 260/45.7 R, 45.75 P; 521/90, 92

[56] References Cited

U.S. PATENT DOCUMENTS

| | | | |
|---|---|---|---|
| 3,951,894 | 4/1976 | Whelan, Jr. | 260/45.75 P |
| 3,956,139 | 5/1976 | Whelan, Jr. | 260/45.75 P |
| 3,993,607 | 11/1976 | Florence | 521/90 |
| 4,033,916 | 7/1977 | Whelan, Jr. | 260/45.75 P |
| 4,043,958 | 8/1977 | Whelan | 260/45.75 P |
| 4,0961,116 | 6/1978 | Lawson | 260/45.75 P |

*Primary Examiner*—Morton Foelak
*Attorney, Agent, or Firm*—Anthony Lagani, Jr.

[57] ABSTRACT

Fire retarded compositions comprise elastomers derived from conjugated, hydrocarbon dienes in combination with a synergistic, three-component flame retardant system comprising (1) a chlorine- and/or bromine-containing fire-retardant additive, (2) alumina trihydrate and (3) an iron oxide.

17 Claims, No Drawings

FLAME RETARDANT FOR HYDROCARBON DIENE RUBBERS

It is well known to produce fire retarded elastomeric compositions by the addition of compounds which reduce flame propagation or substantial combustion of the elastomer. These compounds include halogen-containing organic compounds, esters of phosphoric acid, metal salts and oxides, alumina hydrates, metal borates, etc; see for example U.S. Pat. No. 3,997,493 which teaches the use of these compounds with styrene-butadiene elastomers. Ferric oxide in combination with certain hydrated salts, e.g. magnesium carbonate, is taught as a fire retardant composition for polyvinyl chloride and its copolymers; see U.S. Pat. No. 3,993,607.

Similarly the use of combinations of iron compounds and halogen compounds in flame-retarding nitrile rubbers is taught in U.S. Pat. Nos. 4,033,916 and 4,043,958. However, as disclosed in the latter patent these systems are relatively ineffective when used in styrene-butadiene rubber (SBR) compositions. U.S. Pat. No. 3,697,456 and Canadian Patent No. 1,014,690 teach the use of iron oxide and other oxides as partial replacements for antimony trioxide in flame retarding various polymers containing halogen substituents or halogen compounds, e.g. halogen containing polyurethane foams.

Combinations of a halogen compound with antimony oxide have been found most effective in flame-retarding SBR and other rubbers (*Rubber Chemistry and Technology* 46 (4), 1114-25 (1973)). Additionally, combinations of antimony oxide, chlorinated paraffins and hydrated alumina have been studied in SBR foams (*Rubber Age*, April 1973, pp. 25-32). However, the high cost of antimony oxide in rubber compositions is a substantial disadvantage. It is therefore evident that there is still a need for an effective low cost fire retardant system for SBR and other diene elastomers.

SUMMARY OF THE INVENTION

Diene elastomer compositions are rendered flame retarded by the addition of a synergistic combination of (1) a halogenated organic compound, (2) alumina trihydrate and (3) an iron oxide. The compositions may be cellular or dense rubbers. This flame-retarding system is especially effective in SBR rubber including foams.

The iron oxide can be either a hydrated or anhydrous form of ferric oxide or of ferrosoferric oxide or a mixture thereof. The halogen compound may be polymeric or non-polymeric. Where the diene elastomer has incorporated therein a halogenated monomer the requirement for halogenated compound may be reduced or eliminated depending on the level of halogenated monomer in the polymer and the intended use of the finished elastomeric composition.

DETAILED DESCRIPTION

This invention relates to a flame retarded composition of diene rubber. As used in the specification and claims the term "diene elastomer" means natural rubber as well as elastomers prepared from hydrocarbon conjugated dienes alone or from a major portion of such dienes in combination with one or more ethylenically unsaturated comonomers e.g. styrene, vinyl chloride, vinylidene chloride etc. More particularly it relates to a method of rendering such diene elastomers flame retarded by the addition of a synergist combination of a halogen containing organic compound, alumina trihydrate and an iron oxide wherein the oxide is ferric oxide, ferrosoferric oxide or mixtures thereof. The term "halogen containing organic compound" as used in the specification and claims means a chlorine and/or bromine containing compound.

The diene elastomers which may be rendered flame retarded by the compositions of this invention are homopolymers of hydrocarbon conjugated dienes as well as copolymers of such hydrocarbon dienes with ethylenically unsaturated comonomers, such copolymers containing a major portion of such dienes, and mixtures of such diene elastomers and mixtures of such homopolymers and copolymers. Illustrative examples of the hydrocarbon conjugated dienes of this invention are butadiene and isoprene. The comonomers which may be copolymerized with such dienes are $C_2-C_{12}$ hydrocarbons such as ethylene, propylene, isobutylene, methylstyrene, styrene; $C_3-C_8$ carboxylic acids such as acrylic, methacrylic, ethacrylic, maleic, fumaric, itaconic, or crotonic acid; esters of such acids with $C_1$ to $C_8$ alcohols; or $C_2$ to $C_8$ chlorine and/or bromine substituted unsaturated monomers e.g., vinyl chloride, vinylidene chloride, 2-chloropropene, chlorostyrene, etc. The specific arrangement of comonomer units within the elastomer molecule, e.g., random or as blocks or grafts, is not critical. Illustrative examples of the copolymers useful in the practice of this invention are styrene-butadiene rubber (SBR), carboxylated SBR, chlorostyrene-butadiene rubber, isoprene-methylmethacrylate, butadiene-dimethylmaleate, isoprene-diethylfumarate, butadiene-acrylic acid copolymers, etc. Mixtures of such elastomers may also constitute the elastomer component. The elastomer component may also consist of blends of said elastomer with minor portions of other halogen-free polymers (e.g. elastomers or resins), provided such additives do not destroy the flame retardancy advantage inherent in the practice of this invention.

The halogen containing organic compound may be a polymeric or non-polymeric halogen containing compound. As used in the specification and claims the term "halogenated compound" means a chlorine and/or bromine substituted compound.

The organic, non-polymeric, halogen containing fire-retardant additives which can be utilized in the practice of this invention are well known, being of the class of widely recognized fire-retardant additives for polymers and including chlorine and/or bromine containing compounds of aliphatic, aromatic or alicyclic types having a halogen content of about 35–85% by weight. Substituents other than halogen, such as hydroxyl, anhydride, ether, carboxyl, ester or phosphate ester can also be present provided that such substituents do not interfere with the fire-retardant activity of the compound in the finished composition or otherwise destroy the advantageous properties of the composition. The halogen compounds selected should be substantially non-volatile, stable and non-reactive toward the polymer and any auxiliary ingredients, e.g. rubber curatives, at polymer processing temperatures.

Illustrative examples of non-polymeric chlorine and bromine compounds useful in the practice of this invention include cholorinated paraffins, marketed under a variety of trademarks such as "Chlorowax", Unichlor" and "Cereclor", tetrabromoethane, hexabromobutene-2, tribromoneopentyl alcohol, dibromoneopentyl glycol, dibromobutenediol and its diacetate, methyl pentachlorostearate, and tris (mono- and di-haloalkyl) phosphates, halogenated aromatics such as hexa-, octa-, and decabromobiphenyls, decabromodiphenyl oxide, hexabromobenzene, tribromophenol, tetrabromosalicylanilide, tetra(pentabromophenoxy) silane, dibromopropyl chlorobenzoate, dibromopropyl maleate, tetrachloro- and tetrabromophthalic anhydrides, tetrachloro- and tetrabromobisphenol A and their bishydroxypropyl derivatives, halogenated cycloaliphatics, such as hexabromocyclododecane, pentabromochlorocyclohexane, bis (cyclohexenyl) ethylene hexabromide, hexachlorocyclopentadiene (HCCPD) and its derivatives (typically Diels-Alder adducts with normal or cyclic dienes or olefins and including, for example, chlorendic acid, chlorendic anhydride, dimethyl chlorendate, diallyl chlorendate, perchloropentacyclodecane, and HCCPD adducts with furan, benzoquinone, vinylnorbornene, cyclooctadiene, pentadiene and the like).

Optionally, the halogen compound may be a polymeric compound. The polymeric halogen containing compounds which may be used in the practice of this invention are polychloroprene, chlorinated polyethylene, chlorinated polyvinyl chloride, polyvinylidene chloride, chlorosulfonated polyethylene, and epichlorohydrin polymers or copolymers. It will be evident that the selection of specific polymeric or non-polymeric halogen compounds and the method for incorporating them in the composition, which methods can vary widely within the well-known art, should be consistent with the target physical properties of the finished composition. Mixtures of halogen containing compounds may also be employed.

The amount of halogen compound to be employed in the practice of this invention will be determined by the degree of flame retardancy desired and the tolerable limits of the other properties of the finished compounded elastomer. Generally, about 5 to about 100 parts of halogen compound per 100 parts of elastomer component by weight is used; preferably about 10 to about 85 parts; most preferably about 15 to about 70 parts of halogen compound per 100 parts of elastomer component.

When the diene elastomer comprises a copolymer derived from at least one halogenated monomer the amount of halogen compound required can be reduced. Where the halogenated monomer comprises at least 5 weight percent of the elastomer component the addition of a halogen compound may be omitted without departing from the spirit of this invention. In any event a total of at least 5 parts by weight either of halogenated organic compound or halogenated organic compound plus halogenated monomer per 100 parts of elastomer component is required. As used in the specification and claims the term "halogenated organic compound" includes the halogenated monomer incorporated into the elastomer.

The amount of alumina trihydrate to be employed in the practice of this invention can vary within wide limits depending on the product requirements. Generally, about 10 to about 700 parts of alumina trihydrate per 100 parts of elastomer component by weight can be used. Preferably about 10 to about 250 parts of hydrate per 100 parts of elastomer component is used; more preferably about 40 to about 200 parts of alumina trihydrate is incorporated into the composition.

The iron oxides which can be used in the practice of this invention include both the anhydrous and hydrated forms of ferric oxide and ferrosoferric oxide and mixtures thereof. The term "iron oxide" as used in the specification and claims means any of the aforegoing forms of iron oxide.

In general, about 0.5 parts to 100 parts of iron oxide per 100 parts of elastomer component by weight is required; preferably about 2 to about 20 parts, more preferably about 4 to about 10 parts of iron oxide is used.

The compositions of this invention are readily prepared by conventional dry rubber or latex compounding techniques and the scope of the invention is not intended to be limited by the manner of preparation of the composition. The compositions of this invention include the flame retardants previously described as well as auxiliary ingredients known to the art for use in elastomer compounding. Illustrative of such auxiliary ingredients are curatives, accelerators, activators, plasticizers, extenders, fillers, lubricants, antioxidants, antiozonants, stabilizers, processing aids, blowing agents, colorants, smoke retardants, auxiliary flame retardants etc. and in the case of latex compounds soaps, emulsifiers, dispersing aids, preservatives, gelling agents, sensitizers, thickeners, etc. While curatives are typically required to provide products of suitable properties, they may be omitted in certain compounds such as carpet-backing latices and thermoplastic elastomer compositions.

The compositions of this invention are suitable for a wide variety of applications. They may be used, for example, to produce fire retarded, dense or cellular articles of commerce, such as conveyor belts, hose covers, carpet backing, gasketing, foam seat cushions, foam underlay for carpets, etc.

This invention may be more readily appreciated by reference to the following examples.

EXAMPLE 1

This Example illustrates the novel synergism exhibited by compositions of this invention, thereby providing an unexpectedly high degree of flame-resistance. In carrying out the comparative studies of this example the following base composition was used.

| Component | Parts by Weight |
|---|---|
| SBR1500[1] | 100 |
| Zinc Oxide | 5 |
| Stearic Acid | 1 |
| MBT[2] | 0.5 |
| Monex[3] | 1.5 |
| Sulfur | 1.5 |

[1]SBR 1500 is a cold-polymerized, non-pigmented, rosin-acid emulsified, salt-acid coagulated, staining styrene-butadiene rubber of 23.5% target bound styrene.
[2]mercaptobenzothiazole
[3]accelerator containing tetramethylthiuram monosulfide The effect of additives on the flame-resistance of the composition is shown in the table below. "Chlorowax 70", a chlorinated paraffin, is a commercial product containing about 70% by weight chlorine and having a specific gravity of about 1.66. Alumina trihydrate (ATH) is a commercial product supplied by Reynolds Metals Co. and designated "RH31F".

The rubber compositions were compounded in a conventional manner on a cooled rubber mill. Slab samples were compression molded for 30 minutes at 330° F. Moldings were cooled prior to removal from the press, and specimens were cut to size for testing. Oxygen Index (ASTM D 2863) was employed as the test method, since the numerical rating scale of this method facilitates precise comparison. "ΔOI" in the table designates the increase in Oxygen Index (flame-resistance) over that of the base composition provided by the additives and additive combinations shown.

| Additives: | Parts by Weight of Additive | | | | |
|---|---|---|---|---|---|
| | Chlorowax 70 | Alumina Tri-hydrate | Ferric Oxide | Oxygen Index | ΔOI |
| (a) | 0 | 0 | 0 | 18.9 | — |
| (b) | 0 | 50 | 0 | 21.5 | +2.6 |
| (c) | 0 | 0 | 5 | 18.8 | ~0 |
| (d) | 0 | 50 | 5 | 20.8 | +1.9 |
| (e) | 0 | 0 | 8.4 | 19.1 | +0.2 |
| (f) | 0 | 50 | 8.4 | 20.8 | +1.9 |
| (g) | 25 | 0 | 0 | 20.3 | +1.4 |
| (h) | 25 | 0 | 5 | 21.6 | +2.7 |
| (i) | 25 | 50 | 0 | 23.6 | +4.7 |
| (j) | 25 | 50 | 5 | 25.9 | +7.0 |
| (k) | 64 | 0 | 0 | 24.6 | +5.7 |
| (l) | 64 | 0 | 8.4 | 26.6 | +7.7 |
| (m) | 64 | 50 | 0 | 30.1 | +11.2 |
| (n) | 64 | 50 | 8.4 | 32.4 | +13.5 |

The ΔOI values for compositions (b), (c), (e), and (g) show the negligible to small effects of the alumina trihydrate, iron oxide and halogen compound, when used individually, on the flame resistance of the elastomer composition, while (h), and (i), illustrate the weak to moderate effectiveness of the iron oxide/halogen compound and ATH/halogen compound combinations. Stocks (d) and (f) illustrate that in the absence of the halogen compound, ferric oxide does not abet the activity of ATH.

The ΔOI comparison (j)>(h) or (i) shows that in the presence of the halogen compound the combined metallics (iron oxide and alumina trihydrate) are more effective than either individual metallic. This relationship persists over a broad range of halogen compound loadings as illustrated by the additional comparison (n)>(l) or (m). More strikingly, the comparisons (j)>(b)+(h), (j)>(c)+(i), (n)>(b)+(l) and (n)>(c)+(m) illustrate that over a broad range of halogen compound levels, the addition of the second metallic exerts a fire-retardant effect greater than that expected from the component effects. Finally the comparisons (j)−(i)>(h)−(g) and (j)−(h)>(i)−(g) show that in the presence of the halogen compound the effectiveness of each metallic is abetted by the presence of the other metallic.

EXAMPLE 2

This Example illustrates the effectiveness of the combinations of this invention in providing flame-retarded SBR compositions, as compared to known combinations of high performance, including substantially costlier systems containing antimony trioxide. Significant comparisons are made at equal levels of chloroparaffin. The zinc borate shown is a commercial fire-retardant supplied by Humphrey Chemical Corporation and designated "ZB-112R". Other additives, base compositions, preparations and tests are as described in Example 1.

| Additives | Parts by Weight | | | | |
|---|---|---|---|---|---|
| | (o) | (p) | (q) | (r) | (s) |
| Chlorowax 70 | 25 | 25 | 64 | 64 | 64 |
| Alumina Trihydrate | — | 50 | — | 50 | 50 |
| Ferric Oxide | — | 5 | — | — | 8.4 |

| Additives | Parts by Weight | | | | |
|---|---|---|---|---|---|
| | (o) | (p) | (q) | (r) | (s) |
| Antimony Trioxide | 5 | — | 20 | — | — |
| Zinc Borate | 5 | — | — | 5 | — |
| Oxygen Index | 21.8 | 25.9 | 31.4 | 29.8 | 32.4 |
| ΔOI | +2.9 | +7.0 | +12.5 | +10.9 | +13.5 |

The ΔOI data show that the fire-retardant effectiveness of the new combinations is higher than that of typical high-performance systems comprising combinations of chloroparaffin with antimony trioxide, antimony trioxide/zinc borate and alumina trihydrate/zinc borate. Further perspective is provided by the relatively low effectiveness of alternative fire-retardant agents and combinations, as illustrated by the examples in the table below:

| Additives | Parts by Weight | | | | |
|---|---|---|---|---|---|
| | (t) | (u) | (v) | (w) | (x) |
| Tricresyl Phosphate | 20 | — | — | — | — |
| Isodecyldiphenyl Phosphate | — | 20 | 20 | 20 | — |
| Tetrachlorophthalic Anhydride | — | — | 22.6 | 22.6 | — |
| Hexabromobiphenyl | — | — | — | — | 14.7 |
| Antimony Trioxide | — | — | — | — | 7 |
| Ferric Oxide | — | — | — | 4.2 | — |
| Oxygen Index | 19.3 | 19.0 | 18.7 | 19.7 | 21.0 |
| ΔOI | +0.4 | 0 | 0 | +0.8 | +2.1 |

EXAMPLE 3

As shown in this Example, utilization of the novel flame retardant system of this invention in combination with additional fire-retardant additives, such as antimony trioxide and zinc borate, provides a degree of fire retardancy superior to that obtained with costlier conventional combinations. The additives, base composition and preparations were as described in Examples 1 and 2.

| Additives | Parts by Weight | | | | |
|---|---|---|---|---|---|
| | (y) | (z) | (aa) | (bb) | (cc) |
| Chlorowax 70 | 64 | 64 | 64 | 64 | 64 |
| Alumina Trihydrate | — | — | 50 | 50 | 50 |
| Ferric Oxide | — | — | — | — | 8.4 |
| Antimony Trioxide | 20 | 40 | 20 | 15 | 10 |
| Zinc Borate | — | — | — | 5 | 5 |
| Oxygen Index | 31.4 | 35.8 | 38.9 | 40.2 | 40.7 |
| UL-94V-1/16"* | V-2 | V-0 | V-1 | fails | V-0 |

*Underwriters' Laboratories Vertical Burning Test for Classifying Materials 94 V-0, 94 V-1 or 94 V-2. Specimens were 1/16" in thickness, tested in "as prepared" condition. Performance ratings in order of descending merit are V-0 V-1 V-2 fails.

The comparative data show that composition (cc), containing the economical chloroparaffin/alumina trihydrate/ferric oxide combination and the lowest level of costly antimony trioxide, provides the highest levels of performance in the flammability tests.

EXAMPLE 4

Utilization of the flame retardant system of this invention, with or without additional fire-retardant additives, likewise provides a high degree of fire retardancy in filler-reinforced SBR compositions, as illustrated by the following examples involving SBR/carbon black masterbatch. The base composition in all cases is:

| Component | Parts by Weight |
|---|---|
| SBR 1606 | 162 |
| Zinc Oxide | 5 |
| Stearic Acid | 1 |
| MBTS | 0.8 |
| Monex | 1.5 |
| Sulfur | 3.1 |

SBR 1606 is a cold-polymerized, staining, black SBR masterbatch containing 52 phr N330 carbon black and 10 phr highly aromatic oil, and having a specific gravity of 1.12 and a compound Mooney viscosity (ML-4@212° F.) of typically 52. "MBTS" denotes benzothiazyl disulfide. The other additives were as defined in Examples 1 to 3. Test materials were prepared as in Example 1 except for the compression molding temperature, which was 300° F.

| Additives | Parts by Weight | | | | |
|---|---|---|---|---|---|
| | (dd) | (ee) | (ff) | (gg) | (hh) |
| Chlorowax 70 | 25 | 25 | 25 | 64 | 64 |
| Alumina Trihydrate | — | 50 | 55 | 50 | 80 |
| Ferric Oxide | — | 4.2 | 6.5 | 8.4 | 8.4 |
| Antimony Trioxide | 5 | — | — | — | — |
| Zinc Borate | 5 | 5 | — | 5 | 5 |
| Oxygen Index | 28.9 | 29.8 | 31.7 | 35.8 | 37.3 |
| UL-94V-⅛"* | V-0 | V-0 | V-0 | V-0 | V-0 |
| UL-(94-1/16"* | V-1 | V-1 | V-1 | V-0 | V-0 |

*Specimens of the thickness indicated were tested as defined in Example 3.

The test data show that compositions (ee) through (hh) containing the new combinations of the invention are highly flame-resistant. At equal chloroparaffin levels, the combinations are higher in overall effectiveness than the conventional antimony trioxide system (dd).

EXAMPLE 5

This Example illustrates the utility of this invention in providing flame-retarded natural rubber compositions. In the table below, the first four ingredients were combined in a "B" Banbury internal mixer in a conventional manner. The remaining ingredients were incorporated on a rubber mill with rolls at 160° F. Slab samples were compression molded for 30 minutes at 293° F. After cooling, the specimens were removed from the press and cut to size for testing.

| Formulation | Parts by Weight | |
|---|---|---|
| | (ii) | (jj) |
| Pale Crepe #1 | 100 | 100 |
| Stearic Acid | 3 | 3 |
| Zinc Oxide | 5 | 5 |
| N-330 carbon black | 50 | 50 |
| Chlorowax 70 | 25 | 25 |
| Alumina Trihydrate | 50 | 50 |
| Ferric Oxide | — | 5 |
| MBTS | 0.6 | 0.6 |
| Sulfur | 2.5 | 2.5 |
| Oxygen Index | 24.1 | 28.3 |

The Oxygen Index data show that composition (jj), containing the fire retardants of this invention is more highly flame-retarded than a comparable composition containing a conventional combination (ii).

EXAMPLE 6

This Example illustrates the utilization of ferrosoferric oxide and of other chlorine- or bromine-containing organic fire-retardant additives in the combinations of this invention to yield highly flame-retarded elastomer compositions. The base composition and the preparative procedure were as described in Example 4. Dechlorane Plus 25 is a chlorinated organic fire-retardant additive, containing 65% chlorine, marketed by Hooker Chemical Corporation.

| Additives | Parts by Weight | | | | | |
|---|---|---|---|---|---|---|
| | (kk) | (ll) | (mm) | (nn) | (oo) | (pp) |
| Chlorowax 70 | 25 | 25 | — | — | — | — |
| Dechlorane Plus 25 | — | — | 27 | 27 | — | — |
| Decabromodiphenyl Oxide | — | — | — | — | 21 | 21 |
| Alumina Trihydrate | 50 | 50 | 50 | 50 | 50 | 50 |
| Ferrosoferric Oxide | — | 7 | — | — | — | — |
| Ferric Oxide | — | — | — | 5 | — | 5 |
| Oxygen Index | 26.6 | 28.0 | 25.0 | 28.7 | 26.9 | 28.6 |

The Oxygen Index data show that compositions (ll), (nn), and (pp) containing the new combinations are more highly flame-resistant than corresponding compositions with conventional combinations containing the same halogen compound.

EXAMPLE 7

This Example illustrates the utility of this invention in providing highly flame-retarded elastomer foams in contrast to conventionally flame-retarded analogues.

The foams prepared in this Example are of the no-gel latex SBR type. No-gel latex foams are prepared by whipping or frothing a rubber latex and thereafter dehydrating and curing the rubber foam produced thereby. Methods of preparing no-gel latex foam are well known in the art. A number of such formulations and methods for using those processes for making solid foam products are disclosed in U.S. Pat. Nos. Re. 27,366 and 3,961,001, incorporated herein by reference. A typical SBR composition disclosed in the latter is illustrated in the table below. All parts shown are by dry weight.

| Ingredients | Parts |
|---|---|
| Styrene-butadiene copolymer (LPF-3757, Goodyear) | 100.00 |
| Alkylated phenol non-staining antioxidant (Naugawhite, Uniroyal Chemical) | 1.00 |
| Sodium hexametaphosphate ("Calgon", Calgon Corp.) | 0.50 |
| N-octadecyl disodium sulfosuccinate (Aerosol 18, American Cyanamide Corp.) | 2.50 |
| Sodium salt of sulfate monoester of a mixture of various fatty alcohols, chiefly lauryl alcohol (Aquarex WAQ, duPont) | 1.14 |
| Dry, ground nepheline syenite (Minex 3, American Syenite Corp.) | 70.0 |
| Alumina Trihydrate (Hydral 710, Alcoa) | 70.0 |
| KOH | 0.25 |
| Zinc salt of 2-mercaptobenzothiazole (OXAF, Uniroyal Chemical) | 1.25 |
| Sulfur | 1.65 |
| Zinc Oxide | 1.25 |
| Carbon black-channel type | 1.10 |
| Zinc diethyldithiocarbamate (Ethazate, Uniroyal Chemical) | 0.75 |
| Sodium polyacrylate (Modicol VD, Nopco Chemical) | 0.11 |

A no-gel latex SBR foam formulation was prepared with conventional fire-retardant additives comprising 140 parts of alumina trihydrate (70 parts of Hydral 710 and 70 parts of Alcoa C-30-BF), no Minex 3, 20 parts of chlorinated paraffin (added as 30.8 parts of Delvet 65, a 65% solids dispersion of Chlorowax 70 in water, Diamond Shamrock Chemical Co.) and 5 parts of antimony trioxide. A 6"×18"×15/16" specimen of this foam having a density of 5 lb./ft.$^3$ was tested by the proposed "Standard Method for Surface Flammability of Flexible Cellular Materials Using a Radiant Energy Heat Source" (ASTM Committee D11.17, 01-77 Draft Proposal). The specimen showed a flame spread index (Is) of 106.

In a second preparation, 5 parts of ferric oxide was added to the same formulation. A 6"×18"×15/16" specimen of this foam, having a density of 5 lb./ft.$^3$, showed as Is of 4.

Thus the foam specimen containing the new combination shows far greater flame resistance than the specimen containing the conventional combination of fire-retardant ingredients.

What is claimed is:

1. A flame retarded elastomeric composition comprising:
   (a) a hydrocarbon conjugated diene elastomer wherein said diene elastomer consists of (1) at least one homopolymer of a hydrocarbon conjugated diene; (2) at least one copolymer of a hydrocarbon conjugated diene with at least one ethylenically unsaturated monomer selected from the group consisting of $C_2$ to $C_{12}$ hydrocarbon monomers, $C_3$ to $C_8$ carboxylic acids, esters of said acids with $C_1$ to $C_8$ alcohols, $C_2$ to $C_8$ halogen containing monomers and mixtures thereof; or mixtures of (1) and (2)
   (b) about 5 to about 100 parts by weight per 100 parts by weight of said elastomer of a halogen containing organic compound wherein said compound consists of (1) at least one non-polymeric aliphatic, aromatic or alicylic compound having a halogen content of about 35% to about 85% by weight based on the compound, (2) at least one polymeric compound selected from the group consisting of polychloroprene, chlorinated polyethylene, chlorosulfonated polyethylene, epichlorohydrin polymers and copolymers, chlorinated polyvinyl chloride and polyvinylidene chloride or (3) mixtures thereof;
   (c) about 10 to about 700 parts by weight per 100 parts by weight of said elastomer of alumina trihydrate; and
   (d) about 0.5 to about 100 parts by weight per 100 parts by weight of said elastomer of an iron oxide which is selected from a group consisting of anhydrous ferric oxide, hydrated ferric oxide, anhydrous ferrosoferric oxide, hydrated ferrosoferric oxide or mixtures thereof.

2. The composition of claim 1 wherein the diene elastomer is (1) a homopolymer of a hydrocarbon conjugated diene; (2) a copolymer of a hydrocarbon conjugated diene and at least one ethylenically unsaturated monomer; or (3) mixtures thereof.

3. The composition of claim 2 wherein the diene elastomer is (1) natural rubber, (2) polybutadiene, (3) polyisoprene, (4) a copolymer of butadiene or isoprene or (5) mixtures thereof.

4. The composition of claim 2 wherein the hydrocarbon conjugated diene elastomer is styrene-butadiene rubber, natural rubber or a mixture thereof.

5. The composition of claim 1 or 4 wherein the halogen containing compound is a non-polymeric aliphatic, aromatic or alicylic compound having a halogen content of about 35 to about 85% by weight based on the compound.

6. The composition of claim 1 or 4 wherein the halogen containing compound is a polymeric compound selected from the group consisting of polychloroprene, chlorinated polyethylene, chlorosulfonated polyethylene, polyvinylidene chloride and mixtures thereof.

7. The composition of claim 4 wherein the halogen containing compound is present at about 10 to about 85 parts by weight per 100 parts by weight of elastomer; the alumina trihydrate is present at about 10 to about 250 parts by weight per 100 parts by weight of elastomer and the iron oxide is present at about 2 to about 20 parts by weight per 100 parts by weight of elastomer.

8. The composition of claim 4 wherein the halogen containing compound is present at about 15 to about 70 parts by weight per 100 parts by weight of elastomer, the alumina trihydrate is present at about 40 to about 200 parts by weight per 100 parts by weight of elastomer, and the iron oxide is present at about 4 to about 10 parts by weight per 100 parts by weight of elastomer.

9. The composition of claim 4, 7 or 8 wherein the halogen containing compound is a chlorinated paraffin and the iron oxide is ferric oxide.

10. The composition of claim 4, 7 or 8 wherein the halogen containing compound is a non-polymeric alicyclic chlorine-containing compound and the iron oxide is ferric oxide.

11. The composition of claim 9 wherein the elastomer is styrene-butadiene rubber.

12. The composition of claim 9 wherein the elastomer is natural rubber.

13. The composition of claim 9 wherein the elastomer is a mixture of styrene-butadiene rubber and natural rubber.

14. A flame retarded elastomeric composition comprising:
   (a) a hydrocarbon conjugated diene elastomer which is a copolymer of a major amount of hydrocarbon conjugated diene and a minor amount of a $C_2$ to $C_8$ halogenated monomer;
   (b) about 10 to about 700 parts by weight per 100 parts of elastomer of alumina trihydrate; and
   (c) about 0.5 to about 100 parts by weight per 100 parts of elastomer of an iron oxide.

15. The composition of claim 14 wherein the halogen containing monomer comprises at least five weight percent of the elastomer.

16. The composition of claim 15 wherein the iron oxide is ferric oxide.

17. The composition of claim 1 wherein the elastomeric composition is in cellular form.

* * * * *